(12) United States Patent
Sakurada et al.

(10) Patent No.: US 7,250,190 B2
(45) Date of Patent: Jul. 31, 2007

(54) APPLICATION METHOD, APPLICATOR, OPTICAL MEMBER, AND OPTICAL DEVICE

(75) Inventors: Kazuaki Sakurada, Suwa (JP); Keisuke Takada, Nagano-ken (JP)

(73) Assignee: Seiko Epson Corporation (JP)

( * ) Notice: Subject to any disclaimer, the term of this patent is extended or adjusted under 35 U.S.C. 154(b) by 617 days.

(21) Appl. No.: 10/630,354

(22) Filed: Jul. 30, 2003

(65) Prior Publication Data

US 2004/0142105 A1 Jul. 22, 2004

(30) Foreign Application Priority Data

Aug. 2, 2002 (JP) ............................. 2002-226069
Jul. 17, 2003 (JP) ............................. 2003-198657

(51) Int. Cl.
*B05D 5/00* (2006.01)

(52) U.S. Cl. ................. 427/162; 427/427.3; 427/427.6

(58) Field of Classification Search ................. 427/162, 427/427.3, 427.6
See application file for complete search history.

(56) References Cited

U.S. PATENT DOCUMENTS 5,540,612 A * 7/1996 Mendez ...................... 446/392

FOREIGN PATENT DOCUMENTS

| JP | 09-075826 | 3/1997 |
|----|-----------|--------|
| JP | 10-066913 | 3/1998 |
| JP | 2000-111701 | 4/2000 |
| JP | 2000-288455 | 10/2000 |
| JP | 2001-006664 | 1/2001 |
| WO | WO00/67051 | 9/2000 |

OTHER PUBLICATIONS

Communication from Japanese Patent Office re: related application.

* cited by examiner

*Primary Examiner*—Alain L. Bashore
(74) *Attorney, Agent, or Firm*—Harness, Dickey & Pierce, P.L.C.

(57) ABSTRACT

An applicator including a liquid discharge head for discharging a treatment liquid in droplet form, and a discharge control device for controlling the discharge of droplets from the liquid discharge head. The discharge control device divides a surface of a member into a plurality of regions according to the shape of the surface, and controls the application quantity for each region.

10 Claims, 11 Drawing Sheets

APPLICATION METHOD, APPLICATOR, OPTICAL MEMBER, AND OPTICAL DEVICE

FIELD OF THE INVENTION

The present invention relates to a method of application and an applicator, and particularly to a technique for applying a treatment liquid onto a surface of a member such as an optical member.

BACKGROUND OF THE INVENTION

Surfaces of plastic eyeglass lenses and other optical lenses are generally subjected to treatments for enhancing their performance and functions. Examples of such treatments include a primer coating, a hard coating, a dyeing treatment, and an antireflection treatment.

Primer coatings give an optical lens the function of enhancing the adhesion between the optical lens substrate and a hard coating film, and improve impact resistance. For plastic eyeglass lenses, techniques have widely been used in which a primer liquid is applied onto a surface of the plastic eyeglass lens and is then heated to cure the primer. An immersion method has mainly been used, conventionally, for this technique. In this immersion method, a plastic eyeglass lens is immersed in a primer liquid and allowed to stand while being held by a jig. The lens is then pulled out from the liquid to form a primer film.

Hard coatings give an optical lens many functions, such as enhancing the durability of an optical lens surface, the adhesion between the lens surface and a deposition film, and the stability of dyeing properties. For plastic eyeglass lenses, techniques have widely been used in which a hard coat liquid is applied onto a surface of a plastic eyeglass lens and is then heated to cure the hard coat liquid. An immersion method and an spin coating method have mainly been used for this technique, conventionally. In the immersion method, a plastic eyeglass lens is immersed in a hard coat liquid and allowed to stand while being held by a jig, and is then pulled out from the liquid to form a hard coat film. In the spin coating method, a hard coat liquid is discharged onto a surface of a plastic eyeglass lens and followed by rotating at a high speed. Thus, a hard coat film is formed.

A dyeing treatment is used particularly in manufacturing process of plastic eyeglass lenses for giving lenses fashionability. In this treatment, various colors are dyed, and an immersion method has conventionally been used. In the immersion method, a plastic eyeglass lens is immersed in hot water in which dye particles are dispersed with a surfactant and is then pulled up.

An antireflection treatment is used to prevent reflection at optical lens surfaces. Surface reflection reduces the transmittance of optical systems and increases light not involved in image formation, thus degrading image contrast. An antireflection treatment therefore, provides wearers with good visibility. Antireflection films have conventionally been formed in a single layer or a multilayer by vacuum deposition. A curable liquid having antireflection characteristics has recently been devised.

Application methods such as ink jetting or spraying have been devised for coating techniques in which a treatment liquid is applied onto only a desired region of optical lenses. In ink jetting and spraying methods, droplets of a treatment liquid are discharged from a small nozzle. An apparatus using ink jetting or spraying is reduced in size and can apply a treatment liquid at a low electric power. In addition, the liquid can be used with a high efficiency and production costs can be reduced. Furthermore, these methods are expected to reduce the amounts of used solvents and wastes, which promotes environmental protection.

Application, however, of the curable liquid having antireflection characteristics requires precise and uniform control of film thickness in order to ensure high performance. In an immersion method, the thickness of the coating film decreases at the upper side of the optical member and increases at the lower side due to gravity. Also, in the spin coating method, the thickness of a coating film decreases at the rotation center of the optical member and increases at the outer region due to centrifugal force.

SUMMARY OF THE INVENTION

In view of the foregoing disadvantages, an object of the present invention is to provide an application method through which a uniform coating film can be applied onto a member by using a treatment liquid with an increased efficiency. Another object is to provide an applicator realizing the method.

Yet another object of the present invention is to provide an optical member having high performance, wherein its functions are enhanced by a surface treatment, and an optical device having the optical member. In the method, the treatment liquid is applied in droplet form onto the surface of the member. The surface is divided into a plurality of regions according to the shape of the surface, and an application quantity is controlled for each of the regions.

DETAILED DESCRIPTION OF THE PREFERRED EMBODIMENTS

Figure 1:
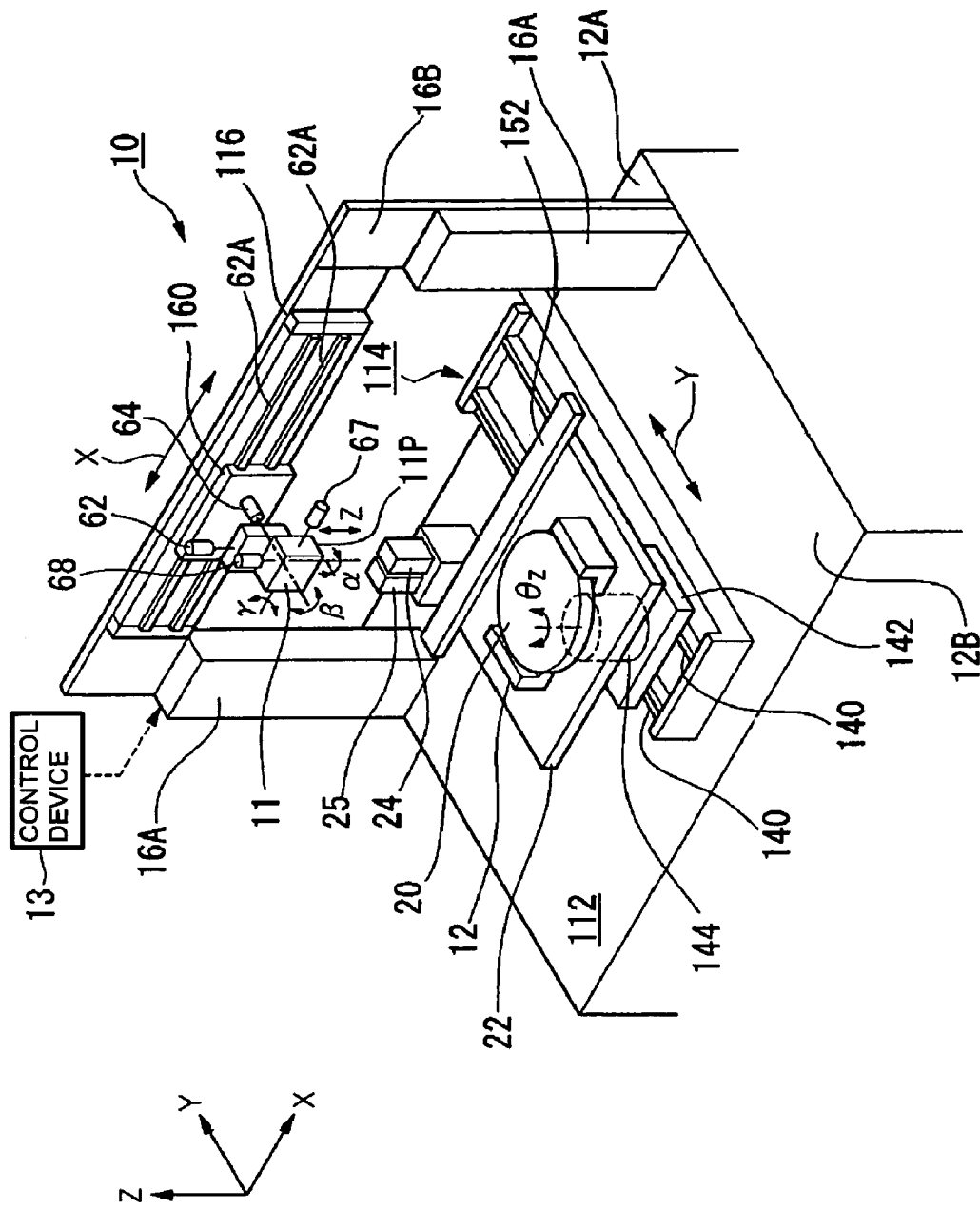
FIG. 1 is a perspective view of an applicator according to an embodiment of the present invention.

In order to achieve the foregoing objects, a method of the present invention is used for applying a treatment liquid onto a surface of a member. In the method, the treatment liquid is applied in droplet form onto the surface of the member. The surface is divided into a plurality of regions according to the shape of the surface of the member, and an application quantity is controlled for each of the regions.

In an application method according to the present invention, a treatment liquid is applied in droplet form, and, thus, most of the treatment liquid is left on the surface of the member as it is. Hence, the treatment liquid is used with a high efficiency. Also, by controlling an application quantity for each of the plurality of regions into which the surface of the member has been divided according to the shape of the surface, the difference in film thickness between the upper side and lower side of the surface due to gravity can be reduced.

For example, by setting the application quantity of the treatment liquid for a region in a higher position in the vertical direction to be larger than the application quantities for other regions, the difference in film thickness between the upper side and lower side of the surface can be reduced, even if part of the treatment liquid runs downward due to gravity.

Specifically, if an application surface of the member is in an upward convex shape in the vertical direction, the curved surface of the member is divided into a plurality of substantially concentric regions, and a larger amount of the treatment liquid is applied to regions in the inner side of the plurality of regions than is applied to the regions in the outer side.

If an application surface of the member is in an upward concave shape in the vertical direction, it is preferable that the curved surface of the member be divided into a plurality of substantially concentric regions, and that the application quantity for a region at a more inner position be set larger than the application quantities for the regions at more outer positions. Thus, the difference in film thickness between the upper side and lower side of the member is reduced in each of the cases where the application surface of the member has a convex shape upward in the vertical direction and where it has a concave shape in the vertical direction.

In the application method described above, it is preferable that at least one of the volume or weight per droplet of the liquid and the landing intervals of droplets is varied so as to control the application quantity. Thus, an application quantity of the treatment liquid can be controlled for each of the plurality of regions into which the surface of the member has been divided. Specifically, the application quantity is increased by increasing the volume of the droplets for a region or by reducing the landing intervals of the droplets; in contrast, it is reduced by reducing the weight of the droplets or by increasing the landing intervals of the droplets. It is also advantageous to repeat application of the treatment liquid onto the surface of the member and to set the number of repetitions of application for each of the plurality of regions. Thus, an application quantity of the treatment liquid can be controlled for each of the plurality of regions into which the surface of the member has been divided. Specifically, the number of repetitions of applying the treatment liquid is varied, so that the application quantity is increased in regions where application is repeated a large number of times and, in contrast, it is reduced in regions where application is repeated a small number of times.

In order to achieve the foregoing objects, an applicator of the present invention is used for applying a treatment liquid onto the surface of a member. The applicator includes a liquid discharge head for discharging the treatment liquid in droplet form, and a discharge control device for controlling the discharge of droplets from the liquid discharge head. The discharge control device divides the surface of the member into a plurality of regions according to the shape of the surface, and controls an application quantity for each of the regions.

Since the applicator of the present invention can realize the application method of the present invention described above, the treatment liquid can be used with a high efficiency and the non-uniformity of film thickness due to gravity can be reduced. Specifically, by applying a treatment liquid in droplet form onto the surface of a member, most of the treatment liquid that has been applied onto the surface of the member is left on the surface of the member as it is. Also, by controlling an application quantity for each of the plurality of regions into which the surface of the member is divided according to the shape of the surface, the difference in film thickness between the upper side and lower side of the surface due to gravity can be reduced.

In the applicator described above, preferably, the discharge control device controls the application quantity by varying at least one of the volume or weight per droplet of the liquid from the liquid discharge head and the landing intervals of droplets.

Alternatively, the discharge control device may apply the treatment liquid onto the surface of the member a plurality of times and set a number of repetitions of application for each of the plurality of regions.

Thus, an application quantity of the treatment liquid can be controlled easily for each of the plurality of regions into which the surface of the member has been divided.

In order to achieve the foregoing objects, an optical member of the present invention has a surface onto which a treatment liquid has been applied with the above-described applicator.

An optical device of the present invention includes the above-described optical member.

The optical member of the present invention achieves a coating film with a high uniformity and excellent performance and functions.

Also, since the optical device of the present invention includes the above-described optical member, its optical properties can be enhanced. Embodiments of the present invention will now be described with reference to the drawings.

Embodiments of the present invention will now be described in detail with reference to the drawings.

FIG. 1 shows an applicator according to an embodiment of the present invention. In FIG. 1, an applicator 10 includes a base 112, a stage 22 disposed on the base 112 for supporting a member 20, a first shifter (shifter) 114 between the base 112 and the stage 22 for movably supporting the stage 22, a liquid discharge head 11 capable of discharging a treatment liquid onto the member 20 supported by the stage 22, a second shifter 116 for movably supporting the liquid discharge head 11, and a discharge control device 13 for controlling the operation of discharging droplets from the liquid discharge head 11. The applicator 10 also includes an electronic balance (not shown in the figure) that acts as a weighing instrument, a capping unit 25, and a cleaning unit 24, on the base 112. The operations of the applicator 10, including the first shifter 114 and the second shifter 116, are controlled by the discharge control device 13.

The first shifter 114 is disposed on the base 112 and is positioned along the Y direction. The second shifter 116 is fixed to support posts 16A that are standing on the base 112 at the backside 12A of the base 112. The X direction (second direction), the direction in which the second shifter 116 moves, is perpendicular to the Y direction (first direction) in which the first shifter 114 moves. The Y direction follows along the foreside 12B to the backside 12A of the base 112. In contrast, the X direction follows along the transverse direction of the base 112. Each of the directions are in a horizontal plane. The z direction is perpendicular to this plane, and therefore, is perpendicular to the X and Y directions.

The first shifter 114 is based on, for example, a linear motor, and includes guide rails 140 A slider 142 is disposed so as to be able to shift along the guide rail 140. To position the slider 142 of the first linear-motor shifter 114, the slider 142 is shifted in the Y direction along the guide rail 140.

The slider 142 has a motor 144 for rotating in a direction ($\theta z$) on a Z axis. The motor 144 may be a direct drive motor, and the rotor of the motor 144 is fixed to the stage 22. Thus, the motor 144, when energized, allows the rotor and the stage 22 to shift together in the $\theta z$ direction, thereby indexing the stage 22. Hence, the first shifter 114 moves the stage 22 in the Y direction (first direction) and the $\theta z$ direction.

The stage 22 has a member holder 12 that may shift a member 20 to predetermined positions with the member 20 held in place.

The second shifter 116 is based on a linear motor, and includes support posts 16A, columns 16B fixed to the respective support posts 16A, a guide rail 62A supported by the columns 16B, and a slider 160 supported in such a manner as to be able to shift in the X direction along the guide rail 62A. That is, the slider 160 shifts in the X direction along the guide rail 62A to be positioned. The liquid discharge head 11 is hung on the slider 160.

The liquid discharge head 11 includes motors 62, 64, 67, and 68 that act as positioning devices in swinging directions. The liquid discharge head 11 is vertically shifted along a Z axis by activating the motor 62. The Z axis extends in the direction (vertical direction) perpendicular to an X axis and a Y axis. The liquid discharge head 11 swings on the Y axis in the $\beta$ direction by activating the motor 64. The liquid discharge head 11 also swings on the X axis in the $\gamma$ direction by activating the motor 67. The liquid discharge head 11 also swings on the Z axis in the ax direction by activating the motor 68. In other words, the second shifter 116 supports the liquid discharge head 11 and enables shifting in the X direction (first direction) and the Z direction. The second shifter 116 also allows movement in the $\theta X$ direction, $\theta Y$ direction, and $\theta Z$ direction.

As described above, the liquid discharge head 11 shown in FIG. 1 is able to shift linearly in the Z axis direction, and to swing in the $\alpha$, $\beta$, and $\gamma$ directions on the slider 160. As such, the position or orientation of the liquid discharge face 11P of the liquid discharge head 11 is able to be precisely controlled with respect to the member 20 on the stage 22. The liquid discharge head 11 is also provided with a plurality of nozzles for discharging droplets at the liquid discharge face 11P.

An electronic balance (not shown in the figure) receives an amount equivalent to, for example, 5000 droplets of the liquid from the nozzles of the liquid discharge head 11 in order to determine and control the weight per droplet of the liquid from the nozzles of the liquid discharge head 11. The weight per droplet of the liquid is accurately obtained by dividing the weight of 5000 droplets measured with the electronic balance by 5000. The discharge quantity of the droplets from the liquid discharge head 11 is suitably controlled according to this determined weight of the droplets.

The cleaning unit 24 cleans the nozzles of the liquid discharge head 11 and other parts regularly during device manufacture or during standby, or whenever necessary. The capping unit 25 caps the liquid discharge face 11P of the liquid discharge head 11 during standby, when devices are not manufactured, to prevent the liquid discharge face 11P from drying.

Since the second shifter 116 shifts the liquid discharge head 11 in the X direction, the liquid discharge head 11 can be selectively positioned over the electronic balance, the cleaning unit 24, or the capping unit 25. Hence, by shifting the liquid discharge head 11 to the electronic balance side, the weight of droplets can be determined even during device manufacture. By shifting the liquid discharge head 11 to above the cleaning unit 24, the liquid discharge head 11 can be cleaned. By shifting the liquid discharge head 11 to above the capping unit 25, the liquid discharge face 11P of the liquid discharge head 11 is capped to prevent drying.

Specifically, the electronic balance, the cleaning unit 24, and the capping unit 25 are disposed on the backside of the base 112 and under the shifting path of the liquid discharge head 11, thereby keeping a distance from the stage 22. Since members 20 are fed to and ejected from the stage 22 at the foreside of the base 112, these operations are not obstructed by the electronic balance, the cleaning unit 24, and the capping unit 25.

As shown in FIG. 1, a pre-discharge area (pre-discharge region) 152 onto which the liquid discharge head 11 preliminarily discharges droplets on a trial basis (pre-discharge) is provided separate from the cleaning unit 24. The pre-discharge region 152 is on a part of the stage 22 other than the region in which the member 20 is supported. Specifically, the pre-discharge area 152 lies along the X direction on the backside of the stage 22, as shown in FIG. 1. The pre-discharge area 152 is secured to the stage 22, and includes a receiver member having a U shape in section, which is open at upper side, and a replaceable absorption member for absorbing discharged droplets put in the U-shaped portion of the receiver member.

Figure 2:
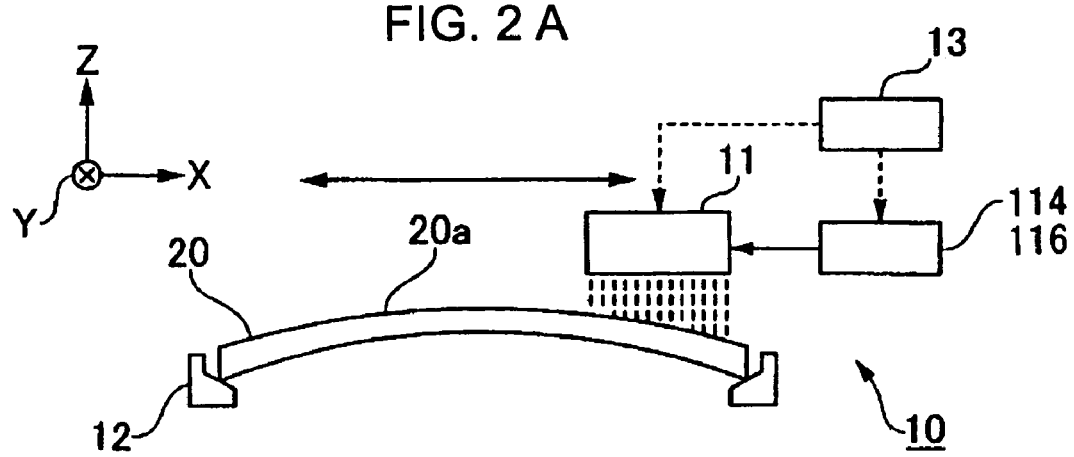
FIG. 2 schematically shows an application method and an applicator according to the present invention, and (a) is a side view and (b) is a plan view.
Figure 2:
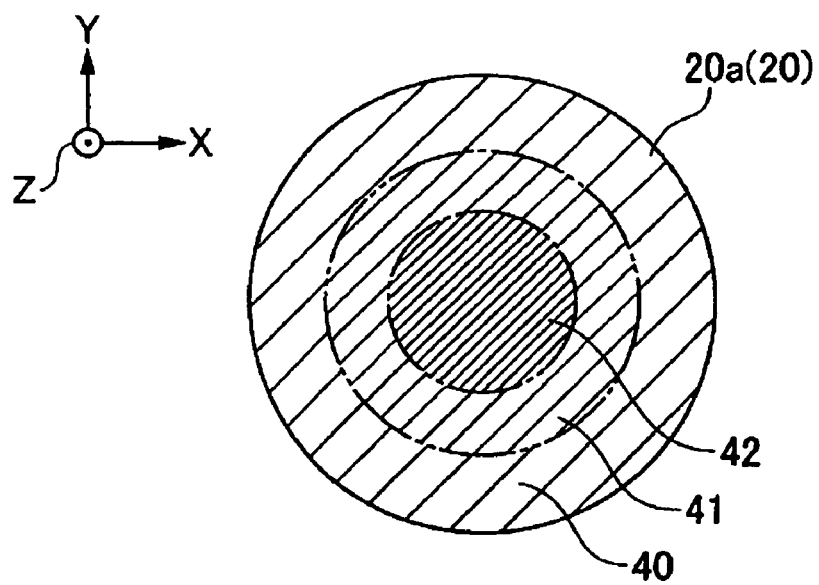

FIGS. 2(*a*) and 2(*b*) are schematic representations of a form of an embodiment of an application method and an applicator according to the present invention, and (a) is a side view and (b) is a plan view.

The applicator 10 shown in FIG. 2(*a*) is used for applying a specific treatment liquid onto a curved surface 20*a* of a member 20, and includes a liquid discharge head 11 for discharging the treatment liquid in droplet form, a member holder 12 for holding the member 20, which is a workpiece to be subjected to application, and a discharge control device 13 for controlling the operation of discharging droplets from the liquid discharge head 11. FIG. 2 is shown in XYZ rectangular coordinates, in which the X axis and the Y axis lie parallel to a horizontal plane and the Z axis runs perpendicular to the horizontal plane.

In the present embodiment, an optical member 20 is the workpiece to be subjected to application. Exemplary optical members include: optical lenses, such as eyeglass lenses, photochromic lenses, sunglasses, camera lenses, telescope lenses, magnifying lenses, projector lenses, pickup lenses, and microlenses; optical millers; optical filters; prisms; optical members of steppers for semiconductor exposure; and organic cover glasses for portable devices. It should be understood, however, that the member 20 to be subjected to application of the present invention is not limited to such optical members, and any type of member may be used as long as it has a curved surface.

Optical members are often subjected to surface treatments, such as a hard coating and an antireflection treatment, by applying a treatment liquid onto their surfaces for enhancing their optical performance and functions. The treatment liquid applied onto the surfaces of an optical member may be part of the raw material of the optical member, the entire raw material of the optical member, part of the raw material of a surface hardening film of the optical member, the entire raw material of the surface hardening film of the optical member, part of the raw material of a primer of the optical member, the entire raw material of the primer of the optical member, part of the raw material of an antireflection film of the optical member, the entire raw material of the antireflection film of the optical member, and so forth.

The raw material composition of the treatment liquid is prepared according to the hardening method used. For example, when a raw material of an optical member; a surface hardening film; a primer; or an antireflection film that is hardened with ultraviolet light, an electron beam, or a microwave, part of the raw material of the optical member, surface hardening film, primer, or antireflection film may be used which does not contain additives because the hardening reaction proceeds without these additives. Examples of additives include a reaction initiator, a catalyst, a solvent, water for allowing a hydrolysis reaction to proceed, and the like. On the other hand, when a raw material of an optical member, a surface hardening film, a primer, or an antireflection film is hardened by heating, the raw material of the optical member, surface hardening film, primer, or antireflection film must contains some additives such as a reaction initiator, a catalyst, a solvent, and water for allowing hydrolysis reaction to proceed. This is because the hardening reaction does not proceed unless these additives are present. Further, a dye and/or a pigment may be added to the treatment liquid to color.

In the application method of the present embodiment, a hard coat liquid (hard coating composition) of the foregoing treatment liquids is applied onto the curved surface 20a of the optical member 20. Specifically, while the optical member 20 and the liquid discharge head 11 are shifted by the first shifter 114 and the second shifter 116, respectively, the hard coat liquid, being a treatment liquid, is discharged in droplet form from a plurality of nozzles of the liquid discharge head 11 (FIG. 2(a)). The application of the droplets is repeated to form a coating film on the curved surface 20a of the optical member 20. Since the treatment liquid is applied in droplet form, most of the treatment liquid applied to the curved surface 20a of the optical member 20 is left on the curved surface 20a as it is. Hence, the treatment liquid can be efficiently used. In the present embodiment, the convex curved surface 20a of the optical member 20 faces upward, and the hard coat liquid is discharged downward from the liquid discharge head 11 located above the optical member 20. The composition of the hard coat liquid will be described in detail later.

In the application method of the present embodiment, when the treatment liquid is applied, the curved surface 20a of the optical member 20 is divided into a plurality of regions, and an application quantity of the treatment liquid is controlled for each of the regions. Specifically, the curved surface 20a of the optical member 20 is divided into a plurality of concentric regions (here, three regions 40, 41, and 42) around the apex of the optical member 20, as shown in FIG. 2(b). The application quantity (quantity per unit area of the treatment liquid) is increased at inner regions of the regions 40, 41, and 42 in comparison with at outer regions. Hence, in the embodiment shown in FIG. 2(b), the application quantity is set to be the smallest in the most outer region 40, and is gradually increased inward through the region 41 to the region 42.

Since the optical member 20 lies such that the curved surface 20a forms a convex shape upward in the vertical direction, part of the treatment liquid applied onto the curved surface 20a moves from the midmost region on the inner side of the curved surface 20a to the outer side due to gravity. Since the application quantity in inner regions is larger than that in outer regions, the movement of part of the treatment liquid from the inner side of the curved surface 20a to the outer side makes the quantity per unit area of the treatment liquid uniform at the curved surface 20a and, thus, the thickness of the resulting coating film becomes uniform. As such, the application method of the present embodiment reduces the difference in film thickness between the upper side and lower side of the curved surface 20a due to gravity.

FIGS. 3(a) and 3(b) show an embodiment in which the treatment liquid is applied onto the other curved surface of the optical member 20, which is a concave curved surface 20b and faces upward in the vertical direction.

In this embodiment, the concave curved surface 20b of the optical member 20 faces upward, and the hard coat liquid is discharged downward from the liquid discharge head 11 located above the optical member 20, as shown in FIG. 3(a).

The concave curved surface 20b of the optical member 20 is divided into a plurality of concentric regions (here, three regions 45, 46, and 47) around the undermost point of the optical member 20, as shown in FIG. 3(b). The application quantity is increased in outer regions of the plurality of regions 45, 46, and 47 in comparison with in inner regions. Hence, the application quantity is set smallest in the most inner region 45, and is gradually increased outward through the region 46 to the region 47 in that order.

In the present embodiment, since the optical member 20 lies such that the curved surface 20b forms a concave shape upward in the vertical direction, part of the treatment liquid applied onto the curved surface 20b moves from the outer side of the curved surface 20b to the midmost region on the inner side due to gravity. Since the application quantity in outer regions is larger than that in inner regions, the movement of part of the treatment liquid from the outer side of the curved surface 20b to the inner side makes the quantity per unit area of the treatment liquid uniform at the curved surface 20b and, thus, the thickness of the resulting coating film becomes uniform. As such, the application method of the present embodiment reduces the difference in film thickness between the upper side and lower side of the curved surface 20b due to gravity, as in the embodiment shown in FIG. 3.

Figure 3:
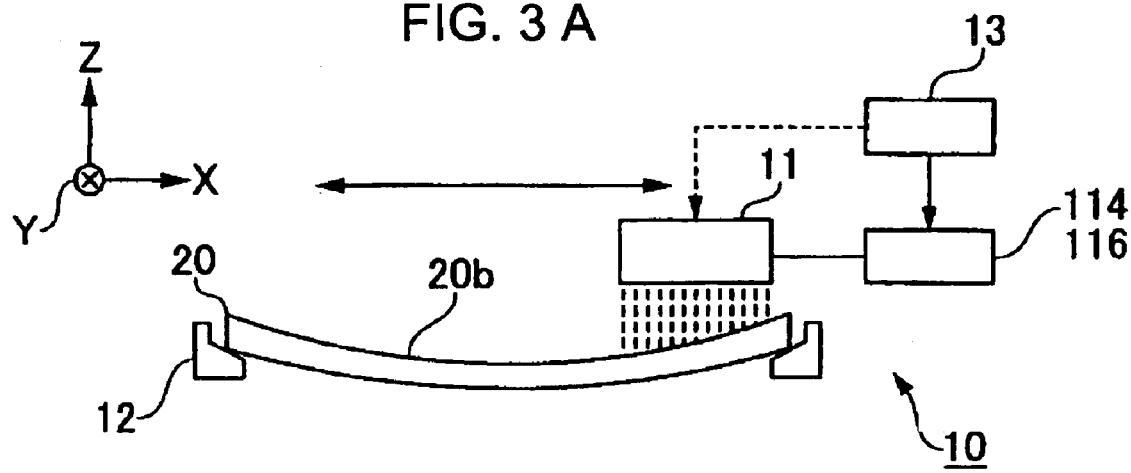
FIG. 3 schematically shows another form of an application method and an applicator according to the present invention, and (a) is a side view and (b) is a plan view.
Figure 3:
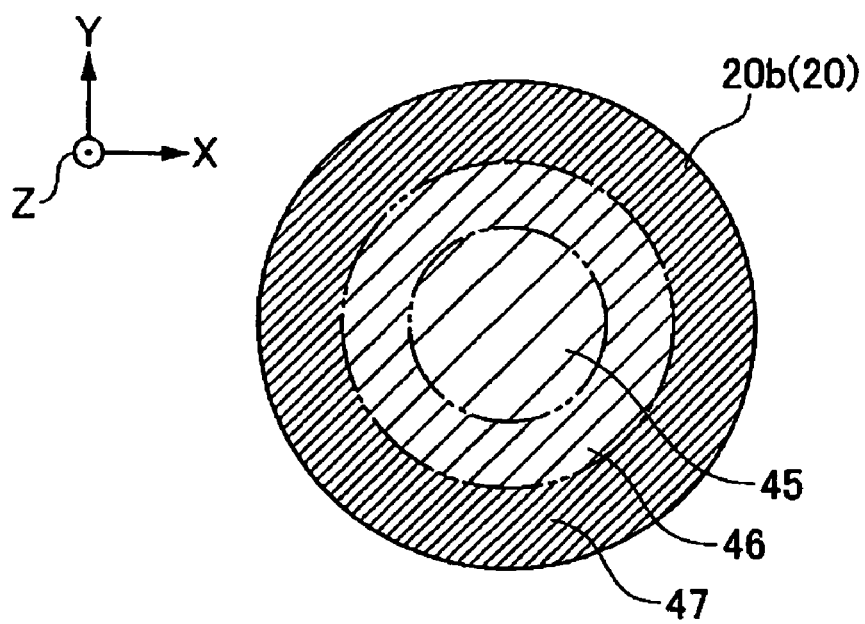

In the embodiments shown in FIGS. 2 and 3, the curved surface of the optical member is divided into three regions in a concentric manner, but it may also be divided into two regions, or four or more regions. Further, when the curved surface is divided into a plurality of regions, the centers of the regions are not necessarily the same. Also, the manner of division is not always concentric and may be arbitrary.

The division of the curved surface is determined according to the shape of the curved surface. For example, if the curved surface has a small curvature radius, the treatment liquid moves easily at the curved surface; therefore, it is advantageous to divide the curved surface into a larger number of regions. In contrast, if the curved surface of the optical member is complex, including a convex plane and a concave plane, for example, it is advantageous to divide the curved surface into a larger number of regions according to the shape of the curved surface.

The application quantity for each region is set according to a desired thickness, the curvature radius and arrangement angle of the curved surface, properties of the treatment liquid such as the evaporation speed, drying conditions, and other factors so that the resulting film thickness after drying becomes uniform. The application quantity for each region is controlled by varying the volume or weight of the droplets discharged from the liquid discharge head, the landing intervals of the droplets, or the number of repetitions of application. An embodiment wherein the number of repetitions of application is varied will now be described. Another embodiment wherein the volume or weight of the droplets and the landing intervals of the droplets are varied will be described later.

Figure 4:
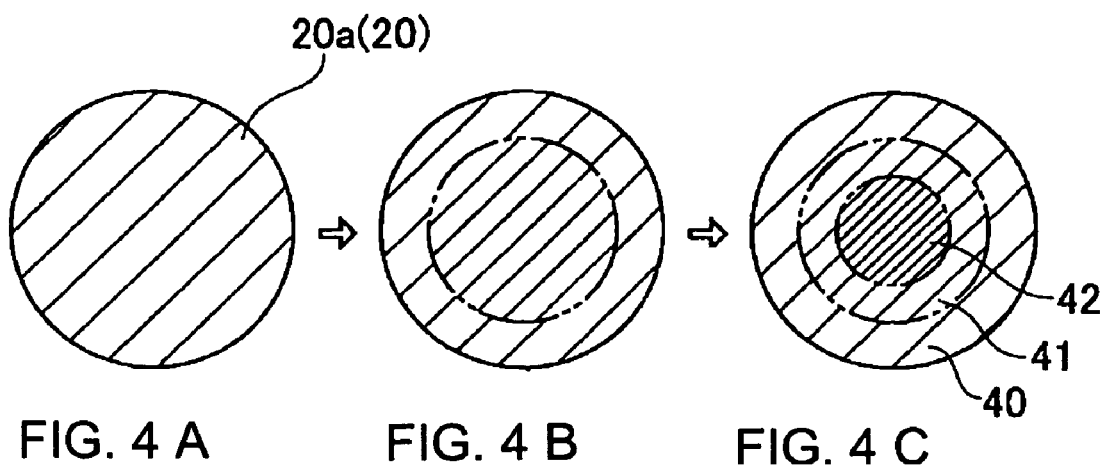
FIG. 4 is a schematic representation in which a treatment liquid is applied onto a curved surface of a member while the number of applications is varied from one region to another, the regions into which the surface is divided.
Figure 5:
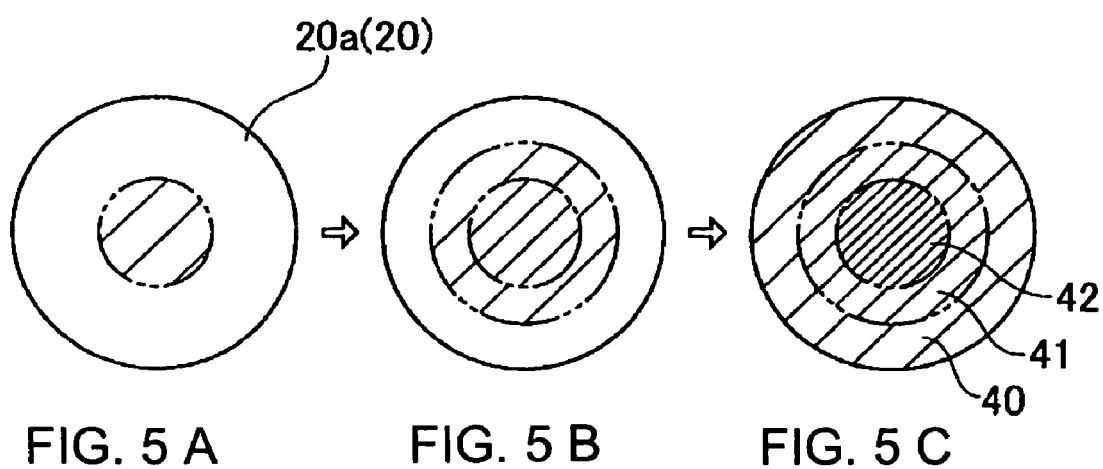
FIG. 5 is another schematic representation in which a treatment liquid is applied onto a curved surface of a member while the number of applications is varied from one region to another, the regions into which the surface is divided.

FIGS. 4 and 5 show embodiments wherein the number of repetitions of application is varied from one region to another. In FIGS. 4 and 5, as in foregoing FIG. 2, the optical member 20 lies such that its curved surface 20a forms a convex shape upward in the vertical direction. The application quantity for inner regions, therefore, has to be increased in comparison with the application quantity on the outer regions by repeatedly applying the treatment liquid.

FIG. 4 shows an embodiment in which the area that is subjected to repetitive applications is gradually reduced. First, a treatment liquid is applied over all the regions of the curved surface 20a of the optical member 20 that are to be subjected to the application, as shown in FIG. 4(a). In this instance, the application is controlled so that the quantity per unit area of the treatment liquid is substantially the same at the curved surface 20a. Turning to FIG. 4(b), the treatment liquid is applied on the more inner areas than the area that has been previously subjected to application. Then, in FIG. 4(c), the treatment liquid is applied on the more inner areas than the area that has been subjected to the second application. Through these three applications, the application quantity (allocation) becomes the smallest in the outer region 40, where the number of applications is the smallest, and the application quantity is gradually increased inward through the region 41 to the region 42, in that order.

FIG. 5 shows an embodiment in which the area subjected to repetitive application is gradually increased. First, a treatment liquid is applied only to the midmost region, of the regions to be subjected to application, of the curved surface 20a of the optical member 20 as shown in FIG. 5(a). In this instance, the application quantity of the treatment liquid is controlled to be substantially the same per unit area in this region. Turning to FIG. 5(b), the treatment liquid is then applied to regions that define a larger area than that of the region that was previously subjected to the application to cover the region that was previously subjected to the application. Then, in FIG. 5(c), the treatment liquid is applied to all of the regions to be subjected to the application so as to cover the regions subjected to the second application. Through these three applications, the application quantity becomes the smallest in the outer region 40, where the number of applications is the smallest, and it is gradually increased inward from the region 41 to the region 42 in that order, as in the embodiment shown in FIG. 4. The embodiment shown in FIG. 5 is different from the embodiment shown in FIG. 4 in that the treatment liquid is applied to cover regions previously subjected to the application and, thus, it has the advantage of covering steps with the following treatment liquid at the ends of the regions subjected to the previous application to reduce the step heights.

The number of repetitive applications onto the curved surface of the optical member is not limited to the three applications as described above. That is, the number of applications may be two, or the number of applications may be more than four times. Further, when the treatment liquid is repeatedly applied onto a curved surface, the coating film may be preliminarily dried after each application, or the applications may be continuously repeated without drying.

A liquid discharge technique in the applicator of the embodiments will now be described.

The foregoing liquid discharge head 11 shown in FIG. 2 discharges a treatment liquid in droplet form onto a surface of a member by a liquid discharge technique, such as ink jetting, to form a coating film. Applicable liquid discharge methods include a piezoelectric method that uses a piezoelectric element to discharge a treatment liquid, a bubble method in which a treatment liquid is bubbled by heating the liquid to discharge the treatment liquid, and other methods known to those skilled in the art. The piezoelectric method among these methods has an advantage in that it does not affect the material composition because the treatment liquid is not heated. In the present embodiment, the piezoelectric method is used in view of its ability to disperse a wide range of types of treatment liquids, and its controllability with respect to the droplets.

It should be understood, however, that the method for applying a treatment liquid onto a surface of a member of the present invention is not limited to the above-described liquid discharge method, and a spray method may be used instead. Applicable spray methods include an air atomization method that uses compressed air, and an airless atomization method in which a high pressure is applied to the material to be discharged from a nozzle tip. A suitable method is selected according to the viscosity and discharge quantity of the treatment liquid.

Figure 6:
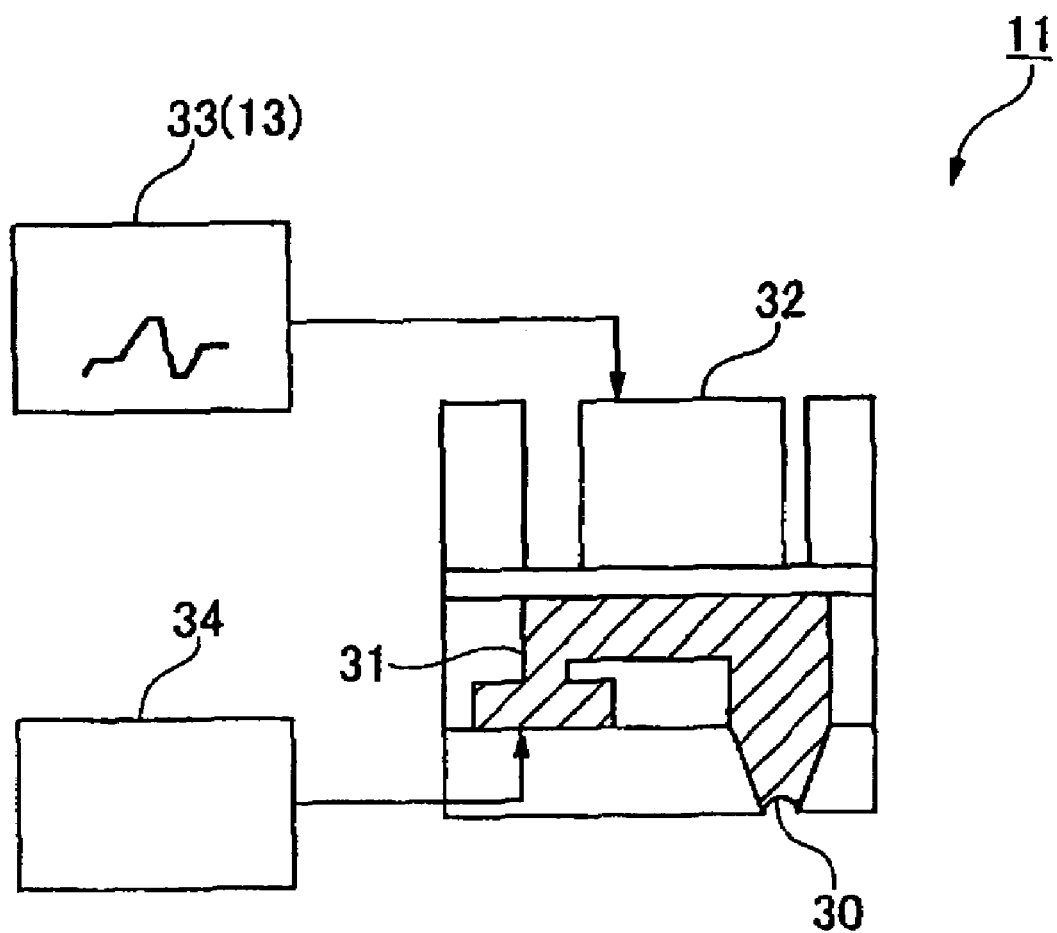
FIG. 6 is a schematic illustration of the principle of liquid discharge by a piezoelectric method.

FIG. 6 is a schematic illustration of the principle of discharge by a piezoelectric method.

In FIG. 6, a piezoelectric element 32 is disposed adjacent to a liquid chamber 31 (pressure chamber) for accommodating a treatment liquid. The liquid chamber 31 is connected with a liquid supply system 34 through which the treatment liquid is supplied. The piezoelectric element 32 is connected with a driving circuit 33 and extends according to a voltage applied through the driving circuit 33. The extension of the piezoelectric element 32 deforms the liquid chamber 31 to press the treatment liquid in the chamber, thereby discharging the treatment liquid in small droplet form from a nozzle 30.

The liquid discharge head 11 has a plurality of nozzles 30 arranged in line. The discharge control device 13 controls the voltage applied to the piezoelectric element, that is it controls the driving signals, to control the operation of discharging the treatment liquid from each of the plurality of nozzles 30. Specifically, the discharge control device 13 varies the volume of droplets, the number per unit time of discharged droplets, the intervals between landed droplets (distances between droplets), and so forth. For example, the landing intervals of a plurality of droplets can be varied by selecting various nozzles to be used from among the plurality of nozzles arranged in line.

Figure 7:
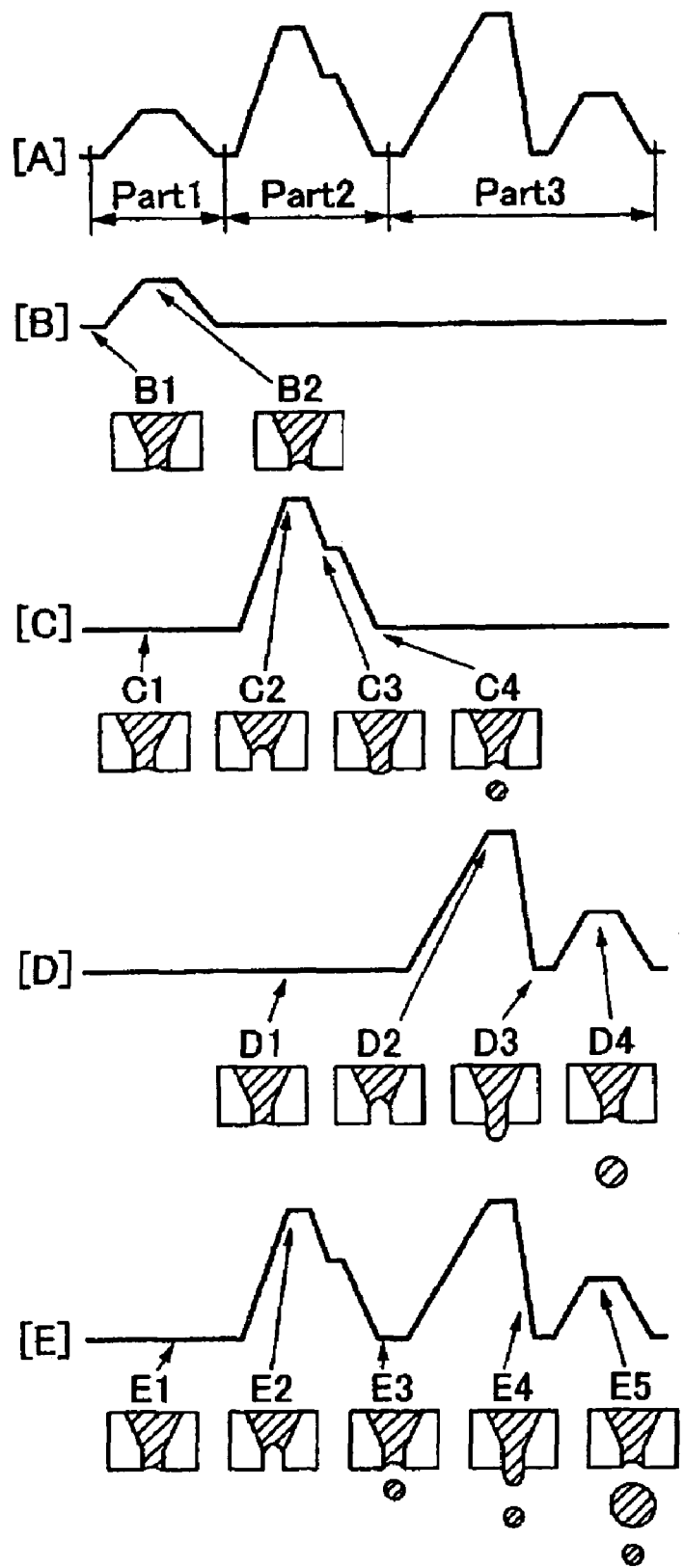
FIG. 7 shows driving signals applied to a piezoelectric element and which include three types for discharging droplets with respective minute, middle, and large dot volumes.

FIG. 7 shows the driving signals applied to the piezoelectric element. The following illustrates the principle of how three different types of droplets with respective minute, middle, and large dot volumes are discharged.

In FIG. 7, driving waveform [A] is a fundamental waveform generated by a driving signal generator circuit. Waveform [B] includes Part 1 of the fundamental waveform and is used for swinging a meniscus (concave or convex face of the liquid) to diffuse the gummy liquid in the vicinity of the nozzle, thereby preventing a discharge failure of the small droplets. B1 represents a state where the meniscus is stable, and B2 represents the operation of slightly drawing the meniscus into the nozzle by gently charging the piezoelectric element to increase the volume of the liquid chamber (pressure chamber). Waveform [C] includes Part 2 of the fundamental waveform and is used for discharging minute dot droplets.

First, the meniscus in a stable state (C1), is quickly drawn into the nozzle by rapidly charging the piezoelectric element. Then, the volume of the liquid chamber is slightly reduced (C3) in synchronization with the timing of beginning a vibration in a direction for filling the nozzle again with the meniscus. Thus, minute dot droplets are discharged.

The second electric discharge (C4) is used after suspending electric discharge functions, not only to suppress the residual vibration of the meniscus and piezoelectric element after the operation of discharging droplets, but also to control the discharge form of droplets. Waveform [D] includes Part 3 of the fundamental waveform and is used for discharging middle dot droplets. The meniscus in a stable state (D1) is gently drawn into the nozzle to a large extent (D2). Then, the volume of the liquid chamber is rapidly reduced (D3) in synchronization with the timing at which the meniscus changes the orientation to a direction for filling the nozzle again with the meniscus. Thus, middle dot droplets are discharged. The piezoelectric element is charged or discharged to suppress the residual vibration of the meniscus and piezoelectric element in D4.

Waveform [E] includes Part 2 and Part 3 of the fundamental waveform and is used for discharging large dot droplets. First, minute dot droplets are discharged in the process through E1, E2, and E3. A waveform for discharging middle dot droplets is applied to the piezoelectric element in synchronization with the timing at which the nozzle is filled with the liquid due to a slight vibration of the meniscus, remaining after the discharge of minute dot droplets. Droplets discharged in a process through E4 and E5 has a dot volume larger than that of the middle dot droplets, and a combination with the foregoing small dot droplets provides still larger dot droplets. By controlling the driving signal as above, three different types of droplets with respective minute, middle, and large dot volumes can be discharged.

Figure 8:
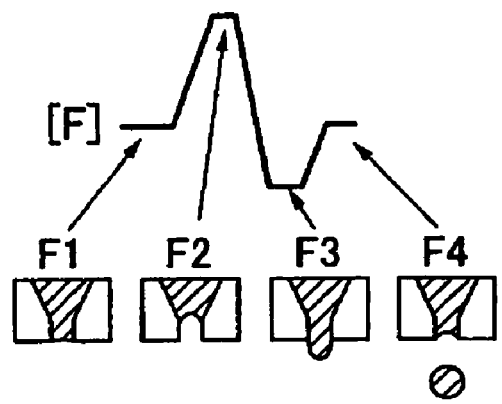
FIG. 8 shows another driving signal applied to a piezoelectric element and which is for discharging a large amount of droplets in per unit time.

FIG. 8 shows driving signal [F] for discharging a large amount of droplets for unit time.

In FIG. 8, F1 represents a statically determinate state where a middle voltage is applied to the piezoelectric element. The meniscus in this state is quickly drawn into the nozzle by charging the piezoelectric element (F2). The piezoelectric element is dynamically extended in synchronization with a timing at which the meniscus vibrates in a direction for filling the nozzle again. The volume of the liquid chamber is reduced following the motion of the piezoelectric element and, consequently, the meniscus is protruded to discharge droplets (F3). Then, recharge is performed (F4) up to a middle potential at the timing of suppressing residual vibration of the meniscus and piezoelectric element. By repeating vibration and excitation of the meniscus as above, droplets can be discharged in a short cycle.

The landing intervals of droplets may be controlled by varying relative shifting speeds of the optical member and the liquid discharge head while the discharge frequency is set constant, or by varying the discharge frequency while the relative speeds of the optical member and the liquid discharge head are set constant.

By reducing the landing intervals of droplets, the discharge density in a specific region increases and the application quantity in the region increases. In contrast, by increasing the landing intervals of droplets, the discharge density in a specific region decreases and the application quantity of the treatment liquid in the region decreases. The landing intervals of droplets (discharge density) can be set by changing the bitmap data that designates the landing positions of the droplets.

Figure 9:
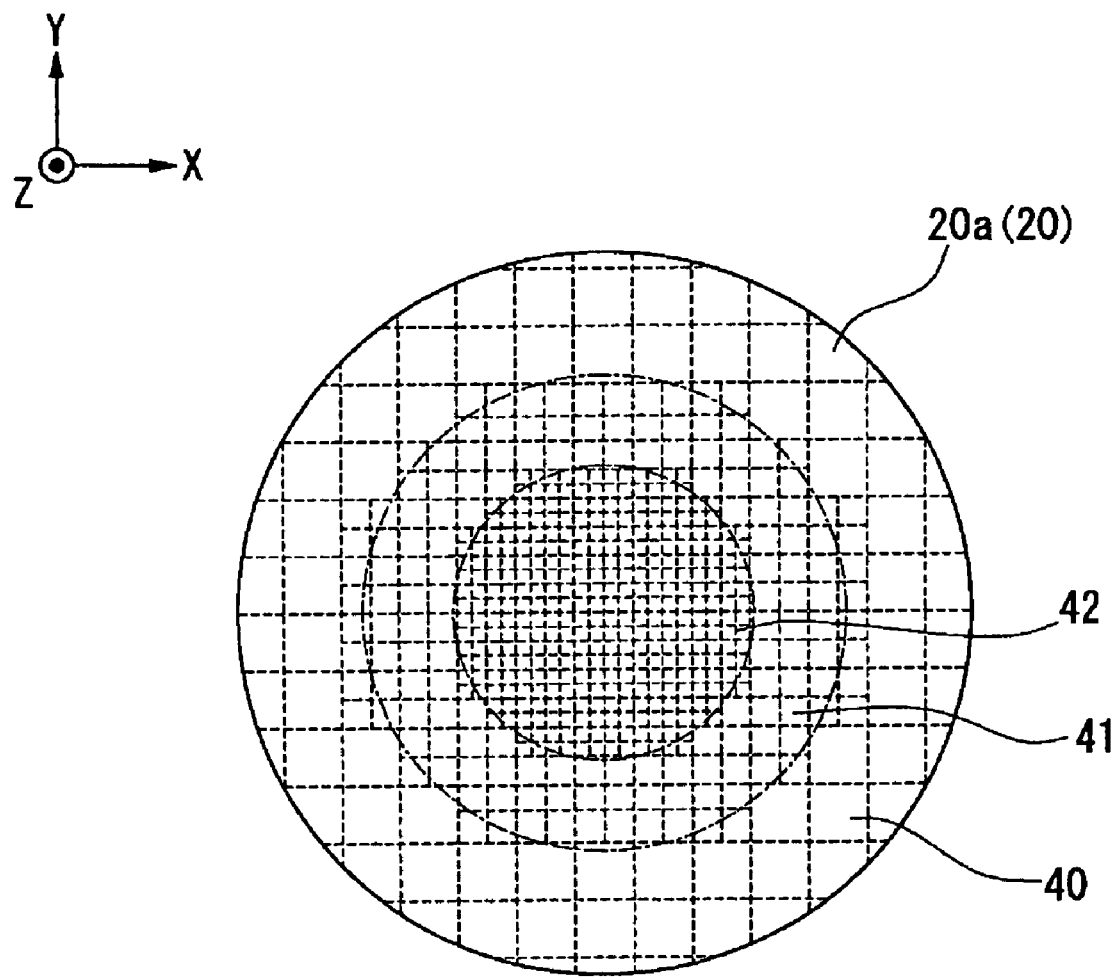
FIG. 9 is a schematic representation in which bitmap data are varied from one region to another, the regions into which the surface is divided.

FIG. 9 shows an embodiment in which the bitmap data is varied from one region to another. That is, the regions into which a surface of the optical member 20 is to be divided. In FIG. 9, the optical member 20 lies such that its curved surface 20a forms a convex shape upward in the vertical direction, as in FIG. 2. The application quantity for inner regions, therefore, has to be increased in comparison with the outer regions.

In the embodiment shown in FIG. 9, the curved surface 20a of the optical member 20 is divided into a plurality of substantially concentric regions (here, three regions 40, 41, and 42) around the apex of the optical member 20. The regions 40, 41, and 42 are each further divided in a grid manner. Thus, a plurality of unit areas (bits), which designate the landing positions of the droplets, are provided. In the present embodiment, regions on the inner side of the regions 40, 41, and 42 are divided into a larger number of areas than that in regions on the outer side so that the unit areas of the region 42, region 41, and region 40 increase in size in order (42<41<40). In other words, the discharge density is set the highest in the midmost region 42, which is divided into the largest number of areas, and it is gradually reduced outward through the region 41 to the region 40, in that order. The application quantity (allocation), therefore, becomes highest in the midmost region 42, where the discharge density is set the highest, and it is gradually reduced outward through the region 41 to the region 40, in that order.

The application quantity may be controlled by using one of a number of applications, the volume or weight per droplet of the liquid, and the landing intervals of droplets that have been described above, or by using a combination of more than one of these factors.

Figure 10:
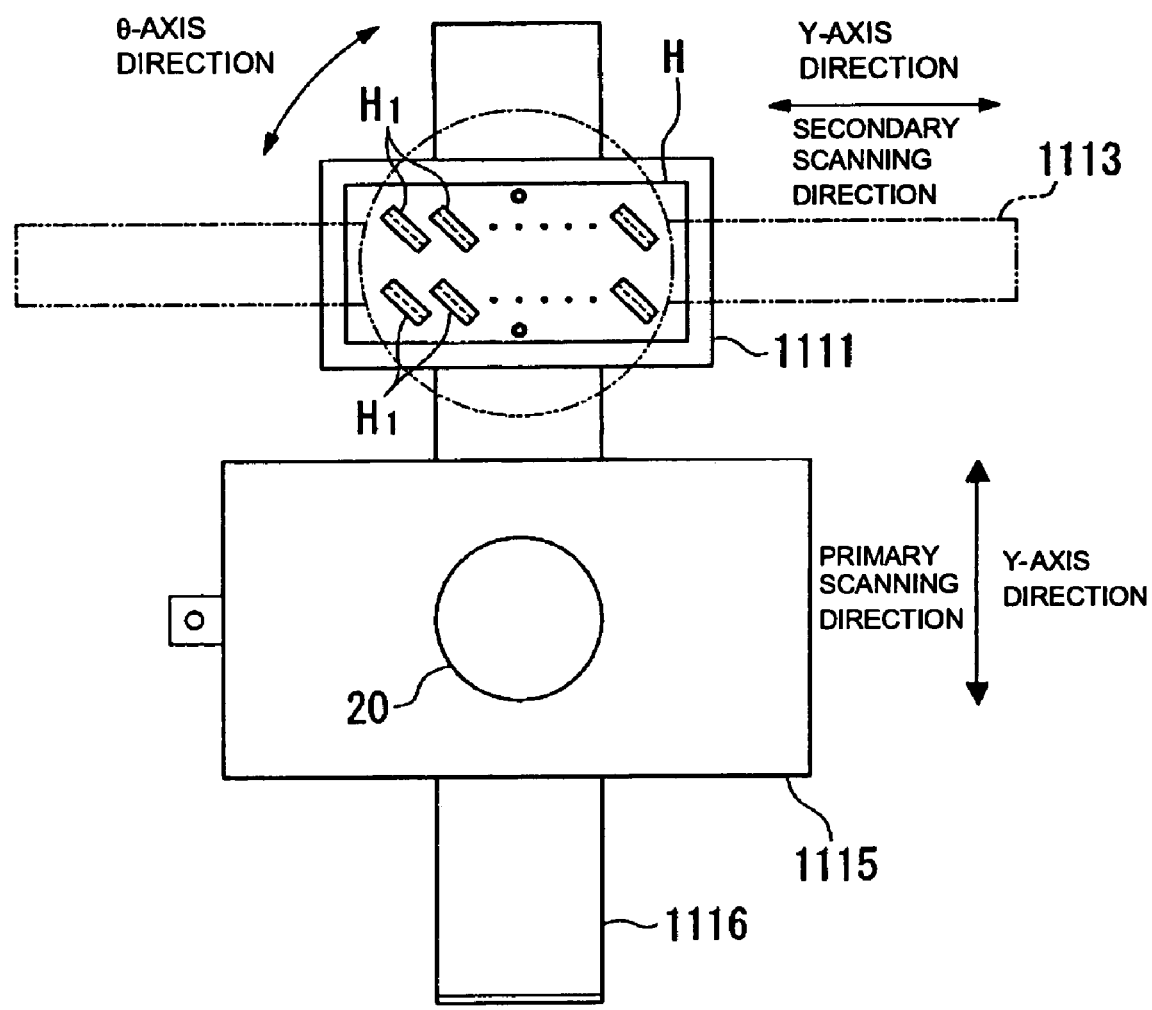
FIG. 10 is a representation of a form of an applicator according to another embodiment.
Figure 11:
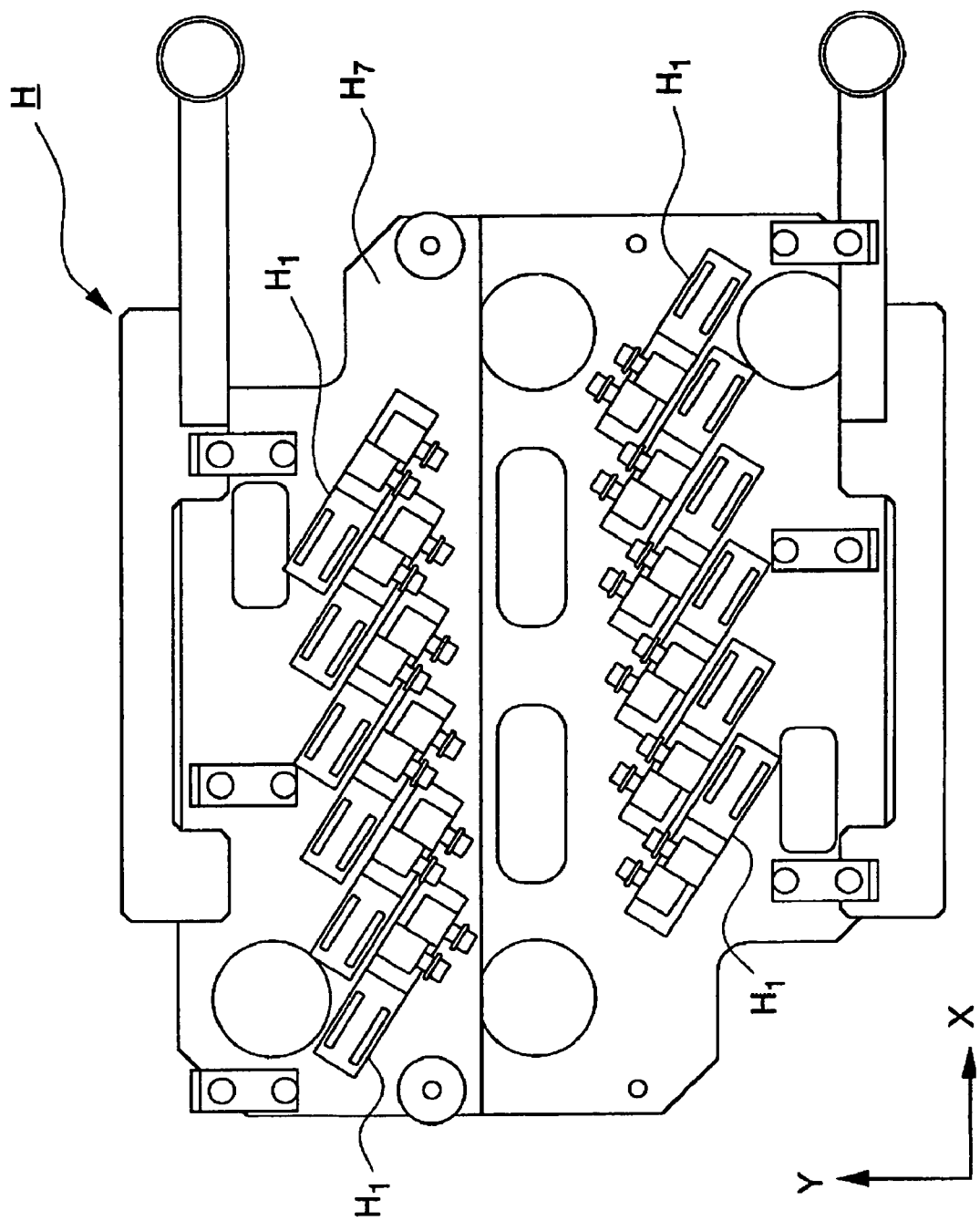
FIG. 11 is representation of a liquid discharge head included in the applicator shown in FIG. 10.

FIG. 10 shows another applicator according to an embodiment, and FIG. 11 shows a liquid discharge head included in this applicator.

The applicator includes a liquid discharge head H including a plurality (twelve in this embodiment) of heads H1. At least two of these heads H1 simultaneously discharge a treatment liquid, thus putting the treatment liquid onto a surface of an optical member 20 being a workpiece at one time (batch drawing).

Specifically, the liquid discharge head H is supported by a supporting member 1111, a guide rail 113, and the like, in such a manner as to be movable in the Y-axis direction (secondary scanning direction) designated in the figure. Each head H is supported by the supporting member 1111 in such a manner to be able to rotate in the θ direction designated in the figure. The optical member 20 is supported by a stage 1115 that is supported with a guide rail 1116 or the like in such a manner to be able to shift in the X-axis direction (primary scanning direction) designated in the figure.

In the liquid discharge head H, the plurality of heads H1 (six in a line, twelve in total, in FIG. 11) are arranged in line substantially along the X-axis direction and in two lines at predetermined intervals along the Y direction, on a supporting board H7. Each head H1 is disposed at a predetermined angle with respect to an X axis (or a Y axis), and the discharge face of the head H1 is provided in line with a plurality of nozzles for discharging liquid.

In the applicator, at least two of the plurality of heads H1 simultaneously discharge the treatment liquid to the optical member 20 placed on the stage 1115, thus putting the treatment liquid onto a surface of the optical member 20 at one time. In this instance, for example, while the head H is shifted in the Y-axis direction along the guide rail 1113, the optical member 20 is shifted in the X-axis direction along the guide rail 1116. The quantities of the treatment liquid discharged from the nozzles of the respective heads H1 are set region by region so that desired quantities of the treatment liquid are put onto desired regions of the optical member 20. Since, in the applicator, the treatment liquid is simultaneously discharged to the optical member 20 from a plurality of heads H1, the treatment speed can be increased.

The hard coat liquid (hard coating composition) used in the application method of the present invention will now be described in terms of its composition. As for the solid contents in the hard coating composition, in order to ensure properties sufficient to serve as a hard coating film, the hard coating composition contains a polymerizable organic compound and inorganic particles as essential ingredients.

The polymerizable organic compound is able to function as a so-called binder in the hard coating film. The polymerizable organic compound may be, for example, an organic silicon compound containing a polymerizable group, such as vinyl, allyl, acrylic, methacrylic, epoxy, mercapto, cyano, isocyano, and amino; and a hydrolyzable group, such as alkoxy, in one molecule. By using such a organic silicon compound as the polymerizable organic compound, a silicone hard coating film can be obtained.

Exemplary organic silicon compounds whose molecule contains a polymerizable group and a hydrolyzable group include vinyltrialkoxysilane, vinyltrichlorosilane, vinyltri(β-methoxy-ethoxy)silane, allyltrialkoxysilane, acryloxypropyltrialkoxysilane, methacryloxypropyltrialkoxysilane, methacryloxypropyldialkoxymethylsilane, mercaptopropyltrialkoxysilane, γ-aminopropyltrialkoxysilane, and N-β(aminoethyl)-γ-aminopropylmethyldialkoxysilane.

The organic silicon compound whose molecule contains an epoxy group and a hydrolyzable group is, preferably, a trialkoxysilane containing a monoepoxy group. Exemplary trialkoxysilanes containing a monoepoxy group include glycidoxymethyltrimethoxysilane, glycidoxymethyltriethoxysilane, glycidoxymethyltripropoxysilane, glycidoxymethyltributoxysilane, α-glycidoxyethyltrimethoxysilane, α-glycidoxyethyltriethoxysilane, α-glycidoxyethyltripropoxysilane, α-glycidoxyethyltributoxysilane, β-glycidoxyethyltrimethoxysilane, β-glycidoxyethyltriethoxysilane, β-glycidoxyethyltripropoxysilane, β-glycidoxyethyltributoxysilane, α-glycidoxypropyltrimethoxysilane, α-glycidoxypropyltriethoxysilane, α-glycidoxypropyltripropoxysilane, α-glycidoxypropyltributoxysilane, β-glycidoxypropyltrimethoxysilane, β-glycidoxypropyltriethoxysilane, β-glycidoxypropyltripropoxysilane, β-glycidoxypropyltributoxysilane, γ-glycidoxypropyltrimethoxysilane, γ-glycidoxypropyltriethoxysilane, γ-glycidoxypropyltripropoxysilane, γ-glycidoxypropyltributoxysilane, α-glycidoxybutyltrimethoxysilane, α-glycidoxybutyltriethoxysilane, α-glycidoxybutyltripropoxysilane, α-glycidoxybutyltributoxysilane, β-glycidoxybutyltrimethoxysilane, β-glycidoxybutyltriethoxysilane, β-glycidoxybutyltripropoxysilane, β-glycidoxybutyltributoxysilane, γ-glycidoxybutyltrimethoxysilane, γ-glycidoxybutyltriethoxysilane, γ-glycidoxybutyltripropoxysilane, γ-glycidoxybutyltributoxysilane, δ-glycidoxybutyltrimethoxysilane, δ-glycidoxybutyltriethoxysilane, δ-glycidoxybutyltripropoxysilane, δ-glycidoxybutyltributoxysilane, β-methylglycidoxymethyltrimethoxysilane, β-methylglycidoxymethyltriethoxysilane, β-methylglycidoxymethyltripropoxysilane, β-methylglycidoxymethyltributoxysilane, β-methyl-α-glycidoxyethyltrimethoxysilane, β-methyl-α-glycidoxyethyltriethoxysilane, β-methyl-α-glycidoxyethyltripropoxysilane, β-methyl-α-glycidoxyethyltributoxysilane, β-methyl-β-glycidoxyethyltrimethoxysilane, β-methyl-β-glycidoxyethyltriethoxysilane, β-methyl-β-glycidoxyethyltripropoxysilane, β-methyl-β-glycidoxyethyltributoxysilane, β-methyl-α-glycidoxypropyltrimethoxysilane, β-methyl-α-glycidoxypropyltriethoxysilane, β-methyl-α-glycidoxypropyltripropoxysilane, β-methyl-α-glycidoxypropyltributoxysilane, β-methyl-β-glycidoxypropyltrimethoxysilane, β-methyl-β-glycidoxypropyltriethoxysilane, β-methyl-β-glycidoxypropyltripropoxysilane, β-methyl-β-glycidoxypropyltributoxysilane, β-methyl-γ-glycidoxypropyltrimethoxysilane, β-methyl-γ-glycidoxypropyltriethoxysilane, β-methyl-γ-glycidoxypropyltripropoxysilane, β-methyl-γ-glycidoxypropyltributoxysilane, β-methyl-α-glycidoxybutyltrimethoxysilane, β-methyl-α-glycidoxybutyltriethloxysilane, β-methyl-α-glycidoxybutyltripropoxysilane, β-methyl-α-glycidoxybutyltributoxysilane, β-methyl-β-glycidoxybutyltrimethoxysilane, β-methyl-β-glycidoxybutyltriethoxysilane, β-methyl-β-glycidoxybutyltripropoxysilane, β-methyl-β-glycidoxybutyltributoxysilane, β-methyl-γ-glycidoxybutyltrimethoxysilane, β-methyl-γ-glycidoxybutyltriethoxysilane, β-methyl-γ-glycidoxybutyltripropoxysilane, β-methyl-γ-glycidoxybutyltributoxysilane, β-methyl-δ-glycidoxybutyltrimethoxysilane, β-methyl-δ-glycidoxybutyltriethoxysilane, and β-methyl-δ-glycidoxybutyltripropoxysilane.

In addition, the trialkoxysilanes containing a monoepoxy group include: aliphatic epoxy compounds, such as β-methyl-δ-glycidoxybutyltributoxysilane; and alicyclic epoxy compounds, such as (3,4-epoxycyclohexyl)methyltrimethoxysilane, (3,4-epoxycyclohexyl)methyltriethoxysilane, (3,4-epoxycyclohexyl)methyltripropoxysilane, (3,4-epoxycyclohexyl)methyltributoxysilane, (3,4-epoxycyclohexyl)ethyltrimethoxysilane, (3,4-epoxycyclohexyl)ethyltriethoxysilane, (3,4-epoxycyclohexyl)ethyltripropoxysilane, (3,4-epoxycyclohexyl)ethyltributoxysilane, (3,4-epoxycyclohexyl)propyltrimethoxysilane, (3,4-epoxycyclohexyl)propyltrimethoxysilane, (3,4-epoxycyclohexyl)propyltriethoxysilane, (3,4-epoxycyclohexyl)propyltripropoxysilane, (3,4-epoxycyclohexyl)propyltributoxysilane, (3,4-epoxycyclohexyl)butyltrimethoxysilane, (3,4- epoxycyclohexyl)butyltriethoxysilane, (3,4-epoxycyclohexyl)butyltripropoxysilane, and (3,4-epoxycyclohexyl)butyltributoxysilane.

Preferably, the polymerizable organic compound content is in the range of 10 to 90 percent by weight, more preferably in the range of 20 to 80 percent by weight, and most preferably in the range of 30 to 70 percent by weight, in the solid contents of the hard coating composition. An excessively low content may negatively affect the adhesion to a plastic workpiece that is to be coated, or to an antireflection film that is to be formed later. Also, an excessively high content may cause the resulting cured film to crack.

The inorganic particles function as a so-called filler of the hard coating film, and generally have a particle size of about 1 to 100 µm. Specifically, the inorganic particles may be metal oxide particles containing at least one metal selected from the group consisting of Si, Sn, Sb, Ce, Zr, and Ti and/or complex particles of metal oxides containing at least two metals selected from the group consisting of Si, Al, Sn, Sb, Ta, Ce, La, Fe, Zn, W, Zr, In, and Ti.

More specifically, the inorganic particles are constituted of particles of, for example, $SiO_2$, $SnO_2$, $Sb_2O_5$, $CeO_2$, $ZrO_2$, or $TiO_2$ dispersed in colloidal form in a disperse medium, such as water, an alcohol, a Cellosolve, and other organic solvents. Alternatively, complex particles containing at least two inorganic oxides selected from the group consisting of Si, Al, Sn, Sb, Ta, Ce, La, Fe, Zn, W, Zr, In, and Ti may be dispersed in colloidal form in a disperse medium, such as water, an alcohol, a Cellosolve, and other organic solvents.

In addition, in order to enhance the disperse stability of the inorganic particles in the hard coat liquid, the surfaces of the particles may be treated with an organic silicon compound or an amine compound. For example, a monofunctional silane, a trifunctional silane, and a tetrafunctional silane may be used as the organic silicon compound for this surface treatment. On the occasion of the treatment, preferably, the hydrolyzable group is in a state where it has reacted with the hydroxy group of the particles. However, even if part of the hydrolyzable group remains, no problem with stability occurs. Exemplary amine compounds include ammonium; alkylamines, such as ethylamine, triethylamine, isopropylamine, and n-propylamine; aralkylamines, such as benzylamine; alicyclic amines, such as piperidine; and alkanolamines, such as monoethanolamine and triethanolamine. Preferably, the content of the organic silicon compound or the amine compound contents is about 1 to 15 percent by weight to the weight of the inorganic particles.

Preferably, the inorganic particle content in the solid contents of the hard coating composition is about 20 to 80 percent by weight, and more preferably about 30 to 70 percent by weight. A lower content leads to a lower viscosity of the composition, but may not ensure a thickness sufficient to form a hard coating film. Also, an excessively high content may cause the resulting coating film to crack.

For the solvent that is used to dilute the hard coating composition, preferably, water is added to an organic solvent in order to prevent clogging in nozzles. The organic solvent improves wettability and adjusts evaporation speed advantageously.

Exemplary organic solvents include: alcohols, such as methanol, ethanol, IPA, and butanol; ketones, such as MEK, 2-pentanone, MIBK, and 2-heptanone; esters, such as methyl acetate, ethyl acetate, propyl acetate, isopropyl acetate, butyl acetate, isobutyl acetate, sec-butyl acetate, isopentyl acetate, methyl propionate, butyl propionate, and 3-methoxybutyl acetate; Cellosolves, such as methyl Cellosolve, ethyl Cellosolve, butyl Cellosolve, isopropyl Cellosolve, propylene glycol monomethyl ether, and propylene glycol monoethyl ether; and 1,4-dioxane. These compounds may be used singly or in combination of at least two compounds.

A water-soluble organic solvent with a high boiling point of 200° C. or more that serves as a liquid wetting agent to prevent clogging may be compounded as the organic solvent. Such water-soluble organic solvents include: alcohols with a valence of 2 to 5 that have a carbon number in the range of 2 to 10 such as ethylene glycol, triethylene glycol, and glycerin; hydrocarbon solvents containing nitrogen, such as formamides, imidazolidinones, pyrrolidone, and amino compounds; and hydrocarbon solvents containing sulfur. These solvent may be used singly or in combination of at least two solvents.

In order to increase the curing speed of the hard coating composition, disilane may be compounded. A disilane compound is obtained, for example, by an addition reaction of a dialkyl carbonate with trichlorosilane, and by subsequent alkoxylation. It can also be obtained by an addition reaction of a compound having groups capable of addition at both ends and a functional group capable of epoxidation in the inside with trichlorosilane or the like, and by subsequent alkoxylation.

Since the addition of disilane increases curing speed to shorten curing time, it advantageously reduces the risk of trapping dust or impurities at the application surface during the process step of application or deposition, therefore improving the yield. Also, the addition of disilane advantageously produces the effects of enhancing stainability, reducing the content of a polyfunctional epoxy compound described below, making non-prominent a faulty point with, for example, a surface flaw in the workpiece.

Preferably, the disilane content is in the range of 3 to 40 percent by weight, and particularly in the range of 5 to 20 percent by weight in the solid contents. An excessively low content may not produce the effect of accelerating the reaction, and an excessively high content may degrade the water resistance of the resulting coating film, or shorten the pot life of the application liquid.

Preferably, a polyfunctional epoxy compound is added to the hard coating composition to enhance the function of serving as a dye component and increase water resistance and hot water resistance. The polyfunctional epoxy compound is widely used as a paint and adhesive, and for casting. Exemplary polyfunctional epoxy compounds include polyolefin epoxy resins that are solidified by peroxidation; alicyclic epoxy resins produced from cyclopentadiene oxide and cyclohexane oxide, or hexahydrophthalic acid and epichlorohydrin, such as polyglycidyl ester; polyglycidyl ethers produced from a polyvalent phenol, such as bisphenol A, catechol, or resorcinol, or a polyvalent alcohol, such as (poly) ethylene glycol, (poly) propylene glycol, neopentyl glycol, glycerin, trimethylolpropane, pentaerythritol, diglycerol, or sorbitol, and epichlorohydrin; epoxidized vegetable oil; epoxy novolac produced from a novolac phenol resin and epichlorohydrin; an epoxy resin produced from phenolphthalein and epichlorohydrin; copolymers of glycidylmethacrylate with a methyl methacrylate-type acrylic monomer or styrene; and epoxy acrylate produced by a glycidyl ring-opening reaction of the epoxy compound mentioned above with a (meth)acrylic acid containing monocarboxylic acid.

Furthermore, the polyfunctional epoxy compounds include: aliphatic epoxy compounds, such as 1,6-exanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxyhivaline ester, trimethylolpropane diglycidyl ether, trimethylolpropane triglycidyl ether, glycerol diglycidyl ether, glycerol triglycidyl ether, diglycerol tetraglycidyl ether, pentaerythritol diglycidyl ether, pentaerythritol triglycidyl ether, dipentaerythritol tetraglycidyl ether, dipentaerythritol tetraglycidyl ether, sorbitol tetraglycidyl ether, diglycidyl ether of tris(2-hydroxyethyl)isocyanurate, and triglycidyl ether of tris(2-hydroxyethyl)isocyanurate; and alicyclic epoxy compounds, such as isophorone diol glycidyl ether and bis-2,2-hydroxycyclohexylpropane diglycidyl ether; aromatic epoxy compounds, such as resorcin diglycidyl ether, bisphenol A diglycidyl ether, bisphenol F diglycidyl ether, bisphenol S diglycidyl ether, orthophthalic acid diglycidyl ether, phenol novolac polyglycidyl ether, and cresol novolac polyglycidyl ether.

Among these compounds, preferable are aliphatic epoxy compounds, such as 1,6-hexanediol diglycidyl ether, diethylene glycol diglycidyl ether, trimethylolpropane diglycidyl ether, glycerol diglycidyl ether, glycerol triglycidyl ether, and triglycidyl ether of tris(2-hydroxyethyl)isocyanurate.

Preferably, the polyfunctional epoxy compound content is in the range of 5 to 40 percent by weight, and more preferably in the range of 5 to 20 percent by weight, in the solid contents. An excessively low content may lead to an insufficient water resistance of the resulting coating film. Also, an excessively high content may lead to an insufficient adhesion with an inorganic vapor deposition film when an antireflection film is provided on the hard coating film.

It is also advantageous to add a tetrafunctional silane compound expressed by the general formula $Si(OR)_4$. Such compounds include tetramethoxysilane, tetraethoxysilane, tetrapropoxysilane, tetraisopropoxysilane, tetrabutoxysilane, tetraphenoxysilane, tetraacetoxysilane, tetraallyloxysilane, tetrakis(2-methoxyethoxy)silane, tetrakis(2-ethylbutoxy)silane, and tetrakis(2-ethylhexyloxy)silane. These compounds may be used singly or in a combination of at least two compounds. Preferably, these compounds are hydrolyzed in the presence of an acid in an inorganic solvent or an organic solvent such as an alcohol, before use.

A curing catalyst may be added to the hard coating composition. Exemplary curing catalysts include following groups (1) to (4):

(1) acetylacetonate containing a metal element of Fe (III), Al (III), Sn (IV), and Ti (IV) as the central atom;
(2) magnesium perchlorate and ammonium perchlorate;
(3) saturated and unsaturated carboxylic acids of a fatty acid, aromatic carboxylic acids, and anhydrides of these acids; and
(4) acetylacetonate containing a metal atom of Li (I), Cu (II), Mn (II), and Mn (III) as the central atom. These may be used singly or in a combination of at least two compounds. In particular, a combination of a curing catalyst in groups (1) to (3) and a curing catalyst in group (4) is preferable from the viewpoint of the increase of pot life.

Preferably, the curing catalyst content is in the range of 0.2 to 10 percent by weight in the solid contents of the hard coating composition, and more preferably in the range of 0.5 to 3 percent by weight. An excessively low content may not achieve any effect, and a higher content is uneconomical in some cases because it may not increase curing speed.

The hard coating composition may contain some of the other additives including colorants such as a pigment and a dye, UV absorbents, leveling agents, surfactants, viscosity adjusters, pH adjusters, photochromic compounds, light and thermal stabilizers such as hindered amines and hindered phenols, antioxidants, and antistatic agents. These ingredients constitute the solid contents.

Preferably, the optical member 20 is subjected to surface treatment, such as alkaline treatment, acid treatment, surfactant treatment, polishing using inorganic or organic particles, primer treatment, or plasma treatment, to enhance adhesion before the application of the hard coat liquid. Also, it is preferable to wash the member 20 with pure water.

The thickness of the hard coating film is preferably in the range of 0.05 to 30 µm. An excessively small thickness may not exhibit sufficient fundamental properties, and an excessive large thickness may negatively affect the evenness of the surface or cause optical distortion.

After being applied to a workpiece by a liquid discharge method, the hard coating composition is heated at temperatures of 40 to 200° C., and preferably of 80 to 130° C., for 30 minutes to 8 hours, thus forming a hard coating film on the surface of the workpiece.

Although the above-described composition has thermosetting properties, a UV curable or electron beam curable, polymerizable organic compound may be used.

Such compounds include photo-curable silicone compositions essentially containing a silicone compound that forms a silanol group by UV exposure and organopolysiloxane having a reaction group that condenses with the silanol group, such as a halogen atom or an amino group; and UV-curable acrylic monomer composition such as UK-6074 produced by Mitsubishi Rayon Co., Ltd.

The resulting hard coating film may be covered with an antireflection film, if necessary. This antireflection film can be obtained by vacuum deposition, ion plating, or sputtering of an inorganic film. In vacuum deposition, ion beam assisting may be applied in which an ion beam is simultaneously radiated during deposition. The film may be composed of a single layer or at least two layers.

Inorganic materials used for forming the antireflection film include $SiO_2$, SiO, $ZrO_2$, TiO, $Ti_2O_3$, $Ti_2O_5$, $Al_2O_3$, $Ta_2O_5$, $CeO_2$, MgO, $Y_2O_3$, $SnO_2$, $MgF_2$, and $WO_3$. These inorganic materials may be used singly or in a combination of at least two materials.

At the time of forming the antireflection film, it is preferable that the hard coating film is subjected to a surface treatment to enhance adhesion. This surface treatment is, for example, an acid treatment, an alkaline treatment, a UV exposure, a plasma treatment by high frequency discharge in an atmosphere of argon or oxygen, or an ion beam treatment using argon, oxygen, or nitrogen.

Figure 12:
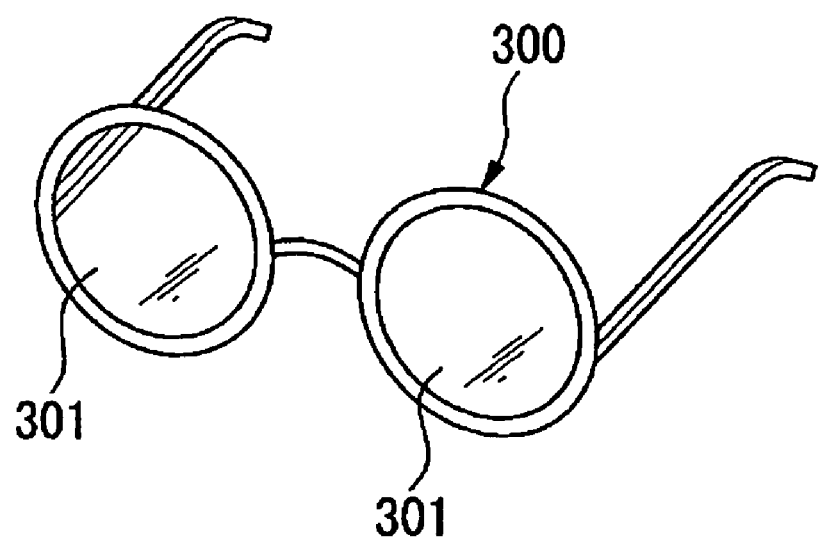
FIG. 12 is a representation of an optical device of the present invention applied to glasses.
Figure 13:
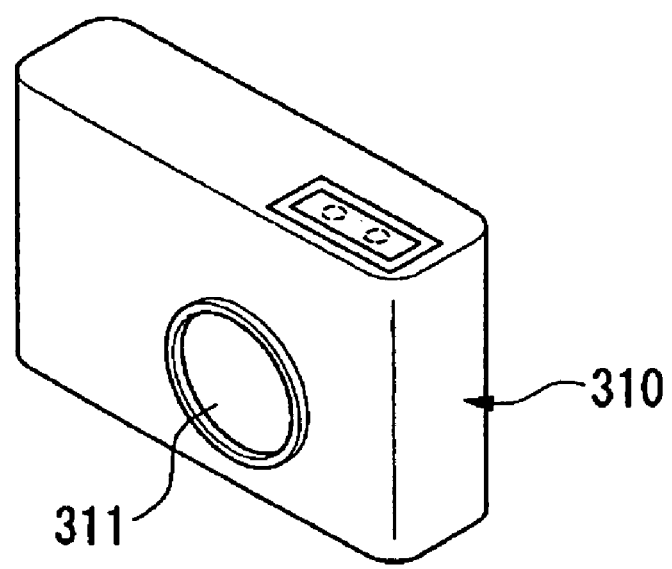
FIG. 13 is a representation of an optical device of the present invention applied to a camera.
Figure 14:
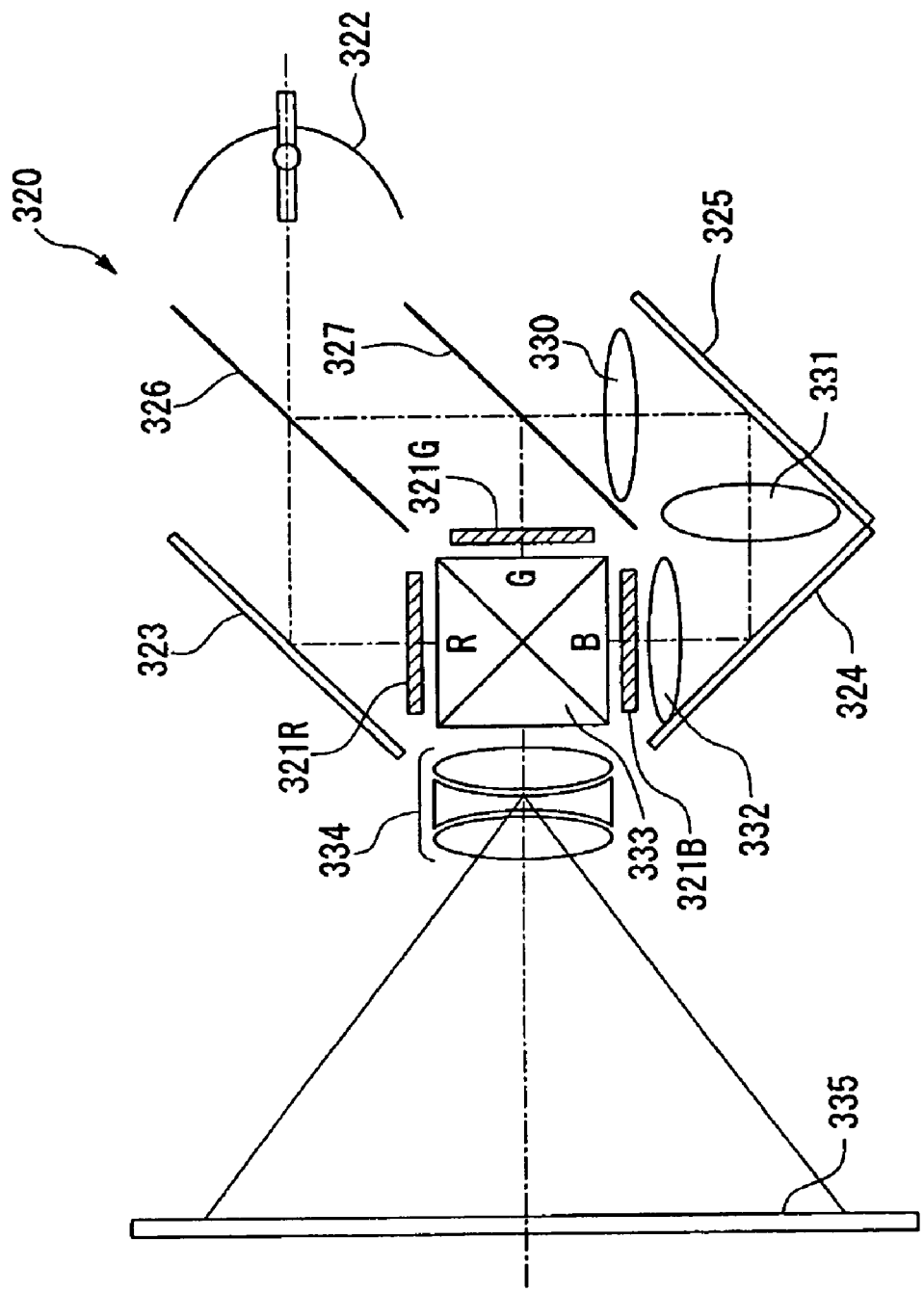
FIG. 14 is a representation of an optical device of the present invention applied to a projector.

FIGS. 12, 13, and 14 are representations of optical devices according to embodiments of the present invention, and respectively show glasses, a camera, and a projector (projection display device).

The glasses 300 shown in FIG. 12, and the camera 310 shown in FIG. 13, respectively, have lenses 301 and 311. The surfaces of the lenses 301 and 311 have been coated with a treatment liquid having a predetermined capability, such as that of a hard coating, by the forgoing application method with the foregoing applicator. Since the application of the treatment liquid by the foregoing application method with the applicator leads to a high uniformity of the surface coating film for the lenses 301 and 311, the glasses 300 and the camera 310 can exhibit excellent optical properties.

The projector 320 shown in FIG. 12 is a liquid crystal projector using transmissive liquid crystal modules as R, G, and B light valves 321R, 321G, and 321B. In the projector 320, light emitted from a lamp unit 322 using a white light source, such as metal halide lamp, is divided into three light components R, G, and B respectively corresponding to the three primary colors R, G, and B (light separating means) by mirrors 323, 324, and 325 and dichroic mirrors 326 and 327. The light components R, G, and B are transmitted to respective light valves 321R, 321G, and 321B (liquid crystal light valves). At this point, light component B is transmitted through a relay lens system including an incident lens 330, a relay lens 331, and an emission lens 332 to prevent optical loss because the optical path for light component B is long. After being modulated by the light valves 321R, 321G, and 321B, light components R, G, and B corresponding to the respective three primary colors enter a dichroic prism 333 (light synthesis means) from three directions to be synthesized again. The synthesized light is projected as a color image onto a screen 335 through a projection lens 334.

In the projector 320, a treatment liquid having a predetermined capability, such as a hard coating, has been applied onto the surface of, for example, at least one of the incident lens 330, the relay lens 331, the emission lens 332, and the projection lens 334 by the foregoing application method with the applicator. Since the application of the treatment liquid by the foregoing application method with the applicator leads to a highly uniform surface coating film for the lens, the projector 320 can exhibit excellent optical properties.

Although the present invention has been described using preferred embodiments with reference to the accompanying drawings, as above, it goes without saying that the present invention is not limited to the forms of the embodiments. The above-described shapes and combinations of components are just examples, and various modifications may be made according to design requirements and the like without departing from the spirit and scope of the invention.

In the application method and the applicator of the present invention, by controlling an application quantity for each of the plurality of regions into which the surface of the member is divided, according to the shape of the surface, the difference in film thickness between the upper side and lower side of a curved surface due to gravity can be reduced to form a uniform coating film over the curved surface.

Also, by applying a treatment liquid in droplet form onto the curved surface, the efficiency in use of the treatment liquid can be increased.

Furthermore, by using the optical member of the present invention, the resulting coating film can exhibit excellent characteristic properties and functions because of a high uniformity of the film.

In addition, since the optical device of the present invention includes the above-described optical member, its optical properties can be enhanced.

What is claimed is:

1. A method for applying a treatment liquid onto a surface of an optical member comprising:
applying a treatment liquid in droplet form onto the surface of the optical member;
dividing the surface into a plurality of regions according to the shape of the surface; and
controlling an application quantity for each of the regions, wherein the application quantity for a region of the plurality of regions in a higher position on the optical member, in the vertical direction, is set larger than the application quantities for other regions, and
wherein the member is an upward convex shape, a curved surface of the optical member is divided into a plurality of substantially concentric regions, and the application quantity for a region of the plurality of regions at a more inner position of the optical member is set larger than the application quantities for the regions at a more outer position.

2. A method for applying a treatment liquid onto a surface of an optical member comprising:
applying a treatment liquid in droplet form onto the surface of the optical member;
dividing the surface into a plurality of regions according to the shape of the surface; and
controlling an application quantity for each of the regions, wherein the application quantity for a region of the plurality of regions in a higher position on the optical member, in the vertical direction, is set larger than the application quantities for other regions, and
wherein the optical member is an upward concave shape, the curved surface of the optical member is divided into a plurality of substantially concentric regions, and the application quantity for a region of the plurality of regions at a more outer position is set larger than the application quantities for the regions at a more inner position.

3. The application method according to claim 1, wherein at least one of the volume, weight per droplet of the liquid, and the landing intervals of the droplets is varied to control the application quantity.

4. The application method according to claim 1, wherein the treatment liquid is applied onto the surface of the member a plurality of times, and a predetermined number of repetitions of the applications is set for each of the plurality of regions.

5. A method for applying a liquid onto an optical lens comprising:
dividing the optical lens into a plurality of concentric regions according to a curved shape of the lens, the plurality of concentric regions including a plurality of outer regions and a plurality of inner regions;
applying a treatment liquid from a discharge device onto the optical lens, the treatment liquid being applied according to a desired thickness of the inner regions in relation to the outer regions of the lens; and
varying the thickness of the treatment liquid by adjusting at least one of a volume of the liquid, a weight per droplet of the liquid, and a landing interval of droplets of the liquid.

6. The method of claim 5, wherein the treatment liquid is selected from the group consisting of hard coat treatment liquids, dyeing treatment liquids, antireflection treatment liquids, and primer coating treatment liquids.

7. The method of claim 5, wherein the curved shape of the lens is either a convex shape or a concave shape.

8. The method of claim 7, wherein the thickness of the treatment liquid is greater at the inner regions of a convex shape than a thickness of the liquid at the outer regions of a convex shape; and
the thickness of the treatment liquid is greater at the outer regions of a concave shape than a thickness of the liquid at the inner regions of a concave shape.

9. The application method according to claim 2, wherein at least one of the volume, weight per droplet of the liquid, and the landing intervals of the droplets is varied to control the application quantity.

10. The application method according to claim 2, wherein the treatment liquid is applied onto the surface of the member a plurality of times, and a predetermined number.

* * * * *